United States Patent
Kubo et al.

(10) Patent No.: US 7,907,187 B2
(45) Date of Patent: Mar. 15, 2011

(54) IMAGE DATA PROCESS APPARATUS SELECTING IMAGE DATA IN A DIRECTORY JUDGED NOT COMPLIANT WITH THE DCF STANDARD AND COMPUTER READABLE MEDIUM ENCODED WITH IMAGE DATA PROCESS PROGRAM TO SELECT SUCH IMAGE DATA

(75) Inventors: Motohiko Kubo, Wakayama (JP); Hiroyuki Ikeda, Wakayama (JP)

(73) Assignee: Noritsu Koki Co., Ltd., Wakayama (JP)

( * ) Notice: Subject to any disclaimer, the term of this patent is extended or adjusted under 35 U.S.C. 154(b) by 907 days.

(21) Appl. No.: 11/780,327

(22) Filed: Jul. 19, 2007

(65) Prior Publication Data

US 2008/0018963 A1    Jan. 24, 2008

(30) Foreign Application Priority Data

Jul. 20, 2006   (JP) ................................ 2006-198520

(51) Int. Cl.
*H04N 5/76* (2006.01)
*G06K 15/00* (2006.01)
(52) U.S. Cl. .................................. 348/231.2; 358/1.16
(58) Field of Classification Search .............. 348/231.2, 348/231.3, 207.2; 358/530
See application file for complete search history.

(56) References Cited

U.S. PATENT DOCUMENTS

| 2003/0151755 A1* | 8/2003 | Nishio et al. | 358/1.9 |
| 2005/0151986 A1 | 7/2005 | Hisatomi et al. | |
| 2006/0087670 A1* | 4/2006 | Smith | 358/1.13 |

FOREIGN PATENT DOCUMENTS

| DE | 20 2005 004 851 U1 | 8/2005 |
| JP | 2001-283321 A | 10/2001 |

* cited by examiner

*Primary Examiner* — Kelly L Jerabek
(74) *Attorney, Agent, or Firm* — Global IP Counselors, LLP (57) ABSTRACT

An image data process apparatus includes a judgment unit and a selection unit. The judgment unit is configured to judge whether or not a directory in which image data is stored is compliant with a DCF standard. The selection unit is configured to select the image data stored in the directory if the directory that has been judged not to be compliant with the DCF standard by the judgment unit. A computer readable medium is encoded with an image data process computer program configured to implement a process of selecting image data that causes a computer to implement a method of selecting image data. Whether or not a directory in which image data is stored is compliant with the DCF standard is judged. The image data stored in the directory that has been judged not to be compliant with the DCF standard during the judging is selected.

6 Claims, 6 Drawing Sheets

IMAGE DATA PROCESS APPARATUS SELECTING IMAGE DATA IN A DIRECTORY JUDGED NOT COMPLIANT WITH THE DCF STANDARD AND COMPUTER READABLE MEDIUM ENCODED WITH IMAGE DATA PROCESS PROGRAM TO SELECT SUCH IMAGE DATA

CROSS-REFERENCE TO RELATED APPLICATIONS

This application claims priority under 35 U.S.C. §119 to Japanese Patent Application No. 2006-198520 filed on Jul. 20, 2006. The entire disclosure of Japanese Patent Application No. 2006-198520 is hereby incorporated herein by reference.

BACKGROUND OF THE INVENTION

1. Field of the Invention

The present invention relates to image data process apparatuses and image data process programs that perform a process of selecting the image data.

2. Background Information

Conventionally, users sometimes edit image data that has been photographed by digital cameras to record it to storage media such as CD-Rs, and operate a reception terminal machine (an image data process apparatus) installed at a photographic print shop by inserting the CD-Rs, so that the print order is set, for example. In this case, for example, the user himself operates the reception terminal machine to select the desired image data from among various image data recorded in the CD-Rs while seeing thumbnail images displayed on the reception terminal machine for the print order. Recently, as the volume of the storage media increases, however, the number of the image data to be recorded on the storage media also increases. Accordingly, it has been difficult to select image data to order from among various image data recorded in the CD-Rs.

For example, Japanese Laid-Open Application Publication No. 2001-283321, published on Oct. 12, 2001, discloses a reception terminal machine that performs the print order in accordance with the order information prerecorded in the storage media.

However, the above-described conventional reception terminal machine includes a problem to be shown below.

Specifically, it is very troublesome to record the order information into the storage media in advance at the reception terminal machine.

SUMMARY OF THE INVENTION

An object of the present invention is to provide image data process apparatuses and image data process programs that make it possible to considerably save troubles of selecting image data.

The foregoing object can basically be attained by providing an image data process apparatus in accordance with a first aspect of the present invention that implements a process of selecting image data. The apparatus comprises a judgment unit configured to judge whether or not a directory in which the image data is stored is compliant with the DCF standard, and a selection unit configured to select the image data whose directory has been judged not to be compliant with the DCF standard by the judgment unit.

In this aspect of the present invention, the image data process apparatus selects the image data whose related information is not compliant with the DCF standard.

The directory includes a folder, for example.

Many of the image data photographed by digital cameras are now compliant with the DCF (Design rule for Camera File system) standard. Accordingly, for example, the file system, the directory structure, the directory name, the file name, and the file format are formed in accordance with the DCF standard. As a result, the file format is formed in accordance with the Exif (Exchange image file format) standard. Recently, as the volume of the storage media such as CD-Rs becomes larger, for example, the user stores image data for various uses in a single piece of storage media in many cases.

Conventionally, in this reception terminal machine (image data process apparatus), for example, the image data that has been edited by users at home and stored in the storage media such as CD-Rs is read into the reception terminal machine installed at the photographic print shop. Then, from among the image data stored in the CD-Rs, the image data the users want to order is selected to configure the setting of print order.

However, it has been very troublesome to select only the image data that has been edited by the user himself to configure the setting of print order, from among the image data for various uses that are stored in the storage media, for example. The image data the user has edited as above is, for example, stored in a folder that is newly formed in an appropriate place in the storage media in many cases. Accordingly, the image data that has been edited by the user is stored in the storage media as image data that is not compliant with the DCF standard, in many cases.

Therefore, in the image data process apparatus that implements a process of selecting the image data in accordance with the present invention, the image data that is stored in a directory which is not compliant with the DCF standard is (i.e., can be) selected.

Accordingly, from among the large-volume image data stored in the storage media, only the image data that is stored in a folder whose name or structure is not compliant with the DCF standard can be selected, for example.

Accordingly, it is possible to select only the image data that has been edited by users at home from the storage media more efficiently than before, for example.

As a result, when the user configures the setting of print order, it is possible to considerably save the user a lot of troubles (i.e., inconvenience and/or time) of selecting the image data for print order, for example.

In an image data process apparatus in accordance with a second aspect of the present invention, the judgment unit further judges, about the image data that is stored in the directory compliant with the DCF standard, whether or not there is a predetermined correspondence between first related information related to the directory in which the image data is stored and second related information related to Exif data in which the image data is contained, and the selection unit further selects the image data that has been judged not to have the predetermined correspondence between the first related information and the second related information by the judgment unit.

In this aspect of the present invention, the image data process apparatus compares the first related information and the second related information to select the image data in which there is no predetermined correspondence between them.

The predetermined correspondence includes a relationship in which the manufacturer names that are indicated by transforming the first related information and the second related information through the predetermined translation table are the same as each other, for example. The first related information includes folder name, and the second related information includes tag information of the Exif data, for example.

Conventionally, in the image data compliant with the DCF standard, for each of manufacturers of the digital cameras used for taking pictures, predetermined folder names corresponding to manufacturers (for example, "100-XX") are given to the folders in which the image data is stored, for example. In addition, for example, for each of manufacturers of the digital cameras used for taking pictures, the Exif data containing the image data includes the tag information indicating the manufacturer (for example, eight-digit alphanumeric characters). In contrast, for example, if the user edits the image data, the manufacturers that are indicated by the name of the folder in which the image data is stored and the tag information that is included in the Exif data in which the image data is contained may be different.

Therefore, in the image data process apparatus that implements a process of selecting the image data in accordance with the present invention, regarding the image data stored in a directory compliant with the DCF standard, the first related information related to the directory in which the image data is stored and the second related information related to Exif data in which the image data is contained are compared to select the image data in which there is no predetermined correspondence.

Accordingly, for example, regarding the image data compliant with the DCF standard that is stored in the storage media, the name of the folder in which the image data is stored and the tag information that is contained in the Exif data in which the image data is contained are transformed through the predetermined translation table. Then, as a result of the transformation, it is possible to select the image data in which the manufacturer names that are indicated by the folder name and the tag information are not the same.

Accordingly, it is possible to select only the image data that has been edited by users at home from the storage media more efficiently, for example.

In an image data process apparatus in accordance with a third aspect of the present invention, the judgment unit further judges, about the image data that is stored in the directory compliant with the DCF standard, whether or not the image data employs a predetermined format, and the selection unit further selects the image data that has been judged not to employ the predetermined format by the judgment unit.

In this aspect of the present invention, the image data process apparatus selects the image data which does not employ the predetermined format.

The predetermined format includes the Exif format, for example.

Conventionally, if the Exif-compliant image data is edited with an off-the-shelf image editing software application that is not compliant with to the Exif standard, the edited image data is stored as JPEG or TIFF data that is not compliant with the Exif standard.

Therefore, the image data process apparatus that implements a process of selecting the image data in accordance with the present invention selects the image data which does not employ the predetermined format.

Accordingly, from among the large-volume image data stored in the storage media, it is possible to select the image data that is not compliant with the Exif standard, such as image data employing the JPEG format or TIFF format for example.

As a result, from the storage media, it is possible to select only the image data that has been edited by users at home more efficiently, for example.

In an image data process apparatus in accordance with a fourth aspect of the present invention the first related information is name of the directory in which the image data is stored, and the second related information is tag information of the Exif data in which the image data is contained.

Accordingly, it is possible to compare manufacturer name that is indicated by the name of the folder in which the image data is stored and the manufacturer name that is indicated by the tag information of the Exif data in which the image data is contained to judge whether or not the same manufacturer names are indicated, and select the image data that does not indicate the same manufacturer name, for example.

Thus, it is possible to compare the folder name of the image data that is stored in the storage media and the tag information of the Exif data in which the image data is contained, for example, to select the image data that has been edited by users at home more efficiently, for example.

An image data process apparatus in accordance with a fifth aspect of the present invention is an apparatus that implements a process of selecting image data. The apparatus comprises a judgment unit configured to judge whether or not the image data employs a predetermined format and a selection unit configured to select the image data that has been judged not to employ the predetermined format by the judgment unit.

In this aspect of the present invention, the image data process apparatus selects the image data that does not employ the predetermined format.

The predetermined format includes the Exif format, for example.

Many of the image data photographed by digital cameras are now compliant with the DCF (Design rule for Camera File system) standard. Accordingly, for example, the file system, the directory structure, the file name, and the file format are formed in accordance with the DCF standard. As a result, the file format is formed in accordance with the Exif (Exchange image file format) standard. Recently, as the volume of the storage media such as CD-Rs becomes larger, for example, the user may store image data for various uses in a single piece of storage media in many cases.

In a conventional image data process apparatus, for example, the user brings the storage media such as CD-Rs in which the image data edited at home is stored to a photographic print shop, and (manually) operates an image data process apparatus installed at the shop himself for configuring the setting of print order.

However, from among the image data for various uses that are stored in the storage media, it is very troublesome to select only the image data that has been edited by the user himself and configure the setting of print order, for example. If the user edits the image data photographed by the digital cameras as described above, the edited image data is stored as JPEG data or the like employing formats different from the Exif format in many cases.

Therefore, the image data process apparatus that implements a process of selecting the image data in accordance with the present invention can select the image data that does not employ the predetermined format.

Accordingly, from among the large-volume image data stored in the storage media, it is possible to select the image data of JPEG or the like employing formats different from the Exif format, for example.

Accordingly, it is possible to select, from among the image data stored in the storage media, only the image data that has been edited by users at home more efficiently than before, for example.

As a result, it is possible to save the user a lot of troubles (i.e., inconvenience and time) in selecting the image data for carrying out the print order when the user configures the setting of print order, for example.

In an image data process apparatus in accordance with a sixth aspect of the present invention, the apparatus further comprises a display unit configured to display the image data selected by the selection unit.

In this aspect of the present invention, the image data process apparatus comprises the display unit.

This makes it possible to display and confirm the image data for the print order on the monitor (display unit) when the user configures the setting of print order at the image data process apparatus in the shop, for example.

An image data process program that causes a computer to implement a method of selecting image data in accordance with a seventh aspect of the present invention implements a process of selecting the image data. The program comprises a first step of judging whether or not a directory in which the image data is stored is compliant with the DCF standard, and a second step of selecting the image data whose directory has been judged not to be compliant with the DCF standard in the first step.

In this aspect of the present invention, the image data process program selects image data whose related information is not compliant with the DCF standard.

The directory includes a folder, for example.

Many of the image data now photographed by digital cameras are compliant with the DCF (Design rule for Camera File system) standard. Accordingly, for example, the file system, the directory structure, the directory name, the file name, and the file format are formed in accordance with the DCF standard. As a result, the file format is formed in accordance with the Exif (Exchange image file format) standard. Recently, as the volume of the storage media such as CD-Rs becomes larger, for example, the user may store image data for various uses in a single piece of storage media in many cases.

Conventionally, in methods of selecting the image data at the reception terminal machine (image data process apparatus), for example, all of the image data that has been stored in the storage media such as CD-Rs (including image data edited by users at home) is read at the reception terminal machine installed in the photographic print shop. Then, from among all image data stored in the CD-Rs, the image data the user wants to order is selected to configure the setting of print order.

However, from among the image data for various uses that are stored in the storage media, for example, it has been very troublesome to select only the image data that has been edited by the user himself to configure the setting of print order. Specifically, the image data the user has edited as above is, for example, stored in a folder that is newly formed in an appropriate place in the storage media in many cases. Accordingly, the image data that has been edited by the user (i.e., in newly made folder) is stored in the storage media in many cases, as image data that is not compliant with the DCF standard.

Therefore, in the image data process program that implements a process of selecting the image data in accordance with the present invention, the image data that is stored in a directory which is not compliant with the DCF standard is selected.

Accordingly, for example, only the image data media that is stored in the folder whose name or structure is not compliant with the DCF standard can be selected from among the large-volume image data stored in the storage media.

Accordingly, it is possible to select only the image data that has been edited by users at home from among the storage media more efficiently than before, for example.

As a result, when the user configures the setting of print order, it is possible to save the user a lot of troubles (inconvenience and/or time) of selecting the image data for print order, for example.

With the image data process apparatus in accordance with the present invention, it is possible to save the user a lot of troubles of selecting the image data for print order when the user configures the setting of print order, for example.

BRIEF DESCRIPTION OF THE DRAWINGS

Referring now to the attached drawings which form a part of this original disclosure.

DETAILED DESCRIPTION OF THE PREFERRED EMBODIMENTS

A photographic print apparatus 1 in accordance with a first embodiment of the present invention will now be described with reference to FIGS. 1-4.

Overall Structure of the Photographic Print Apparatus 1

Figure 1:
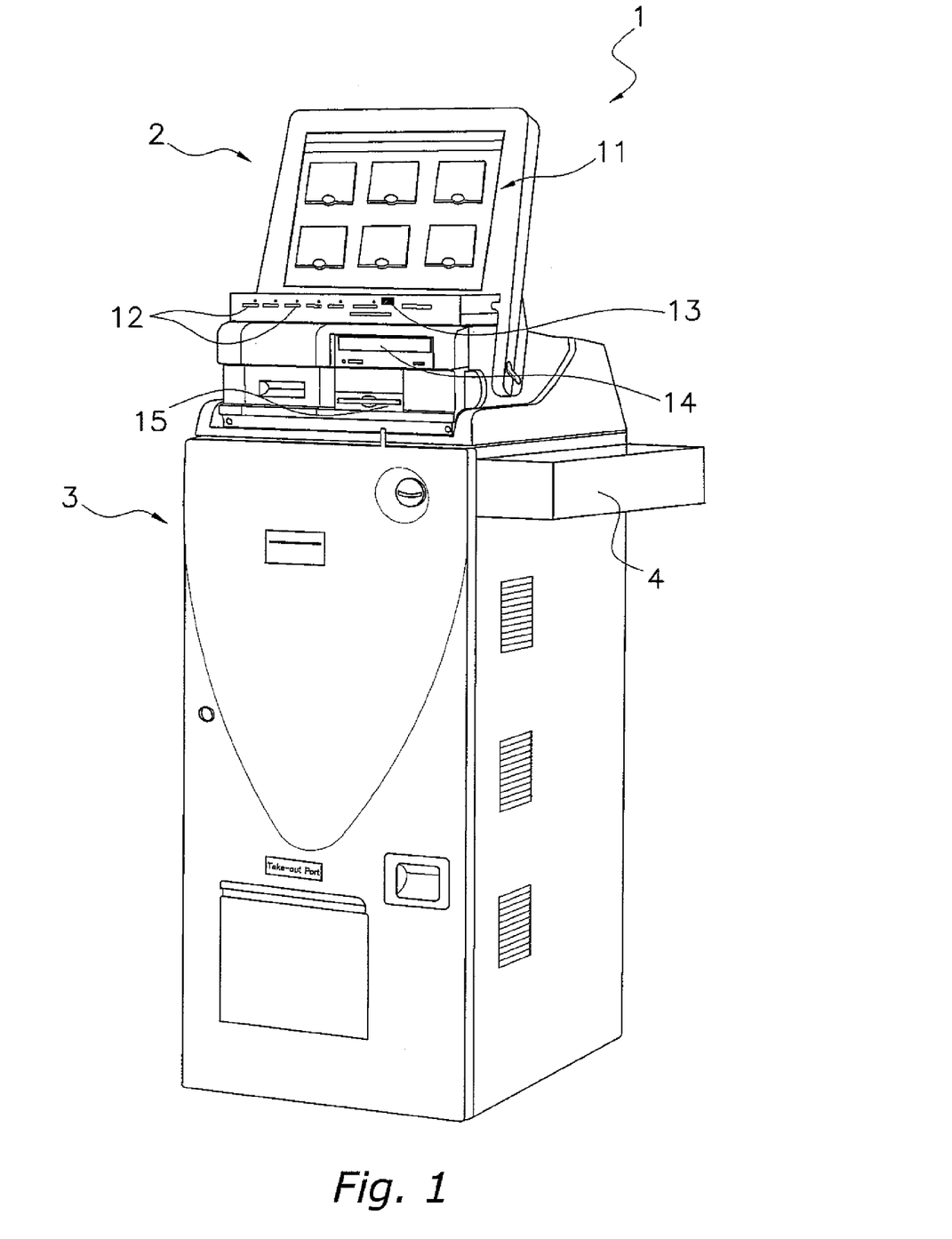
FIG. 1 is a perspective (external) view of a photographic print apparatus in accordance with one embodiment of the present invention.

The photographic print apparatus 1 in accordance with one embodiment of the present invention is preferably a shop reception machine that can be installed in photographic print shops, for example, as shown in FIG. 1. The photographic print apparatus 1 acquires, for example, image data that have been edited by users at home from among a number of image data stored in various storage media such as CD-R and USB memory by a selection process method (described later in detail) in accordance with the present invention. Then, when the user inputs the setting of print order including the print number and print size of the image data edited by the user, the photographic print is performed, the entry taking effect. The photographic print apparatus 1 includes a reception terminal machine (image data process apparatus) 2 including a monitor 11, a printer 3, and a box 4.

The reception terminal machine 2 is installed on the printer 3, and includes the monitor (display unit) 11, a media reader 12, an ultrared ray (infrared) photo receiver 13, a CD (compact disc) drive 14, and an FD (FLOPPY, registered trademark, discs) drive 15.

The printer 3 performs the photographic print of the image data obtained at the reception terminal machine 2 based on the print number and image process handling set by the user.

The box 4 is located on a side of the upper portion of the printer 3, and contains print claim checks in which administration numbers are written. The print claim check will be described in detail later.

The monitor 11 is a display unit of touch panel type, wherein the setting of the print number and image handling process are input by pushing icons or buttons. The monitor 11 displays an operation input display 100 described in detail later.

This allows the user to confirm image data that has been edited by the user to be displayed on image display areas 101 of the operation input display 100 (refer to FIG. 3) described in detail later, when the user configures the setting of print order at the reception terminal machine 2 in the shop.

The media reader 12 includes various slots for various storage media, and obtains the image data from the inserted storage media.

The ultra red (infrared) ray photo receiver 13 acquires the image data that is sent from a camera cell-phone through the infrared data communication. It is possible to acquire the image data from the camera cell-phone through not only the infrared data communication but also special cables.

The CD drive 14 and FD drive 15 incorporate the CD-R/RW and FD respectively to acquire the recorded image data. The CD drive 14 can also record the image data that has been image-processed.

The user configures the various settings such as print size and print number on operation displays of the operation input display 100 (described in detail later) to be displayed on the monitor 11 at the reception terminal machine 2. The reception terminal machine 2 includes storage devices (not shown) such as ROM, RAM, and HDD. At the reception terminal machine 2, through the operation displays of the operation input display 100, in accordance with instructions that have been input by the user, the CPU reads in an image data process program stored in the storage device, for example. This makes it possible to perform the selection process for image data that is read from the media reader 12, the ultra red ray photo receiver 13, the CD drive 14 or the FD drive 15 at the reception terminal machine 2 to form functions necessary to display on the operation input display 100 as functional blocks.

Figure 2:
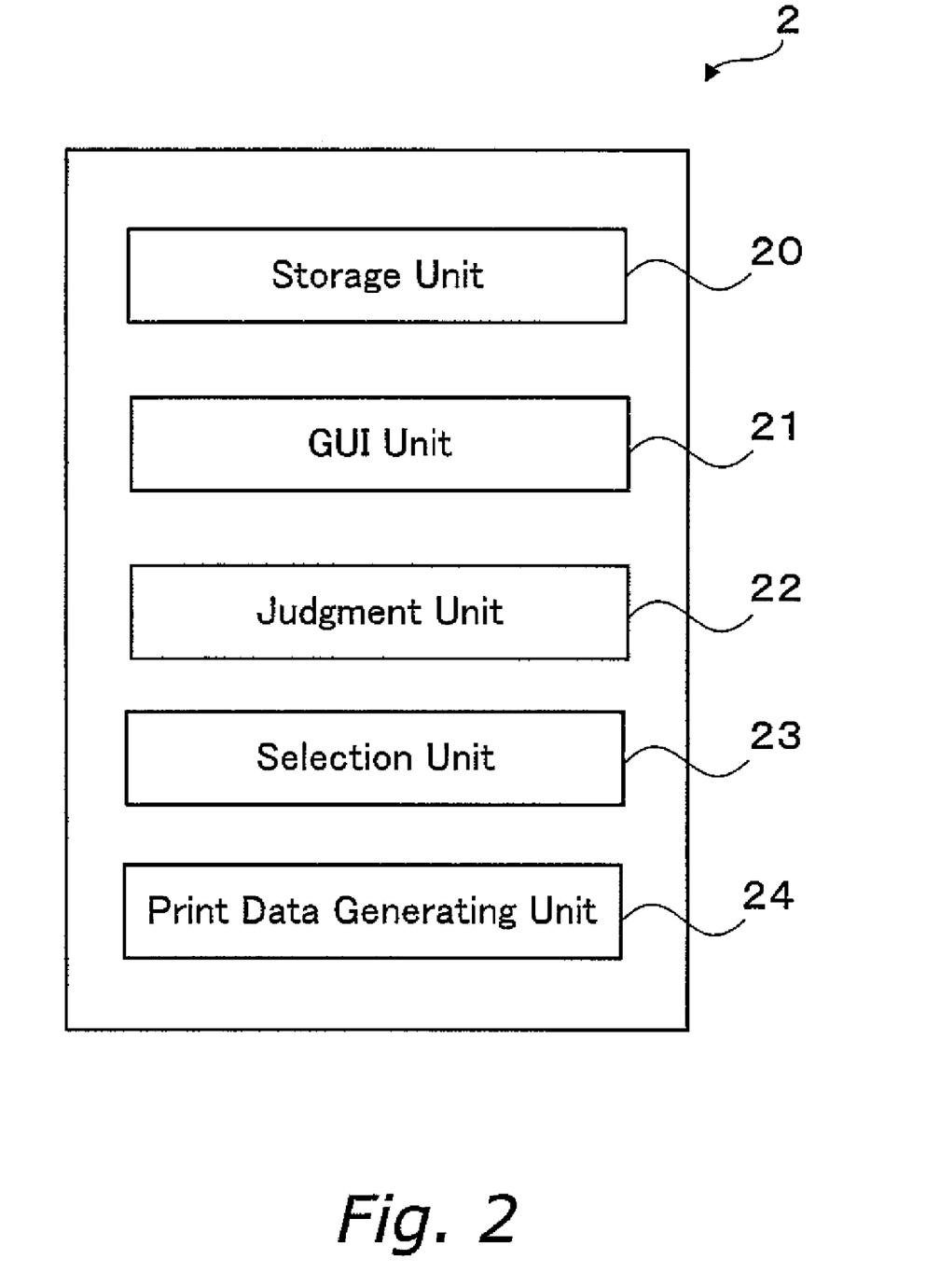
FIG. 2 is an abstract view of the functional parts of (functional blocks to be formed at) the reception terminal machine in FIG. 1.

The reception terminal machine 2 includes, as shown in FIG. 2, a storage unit 20, a GUI unit 21, a judgment unit 22, a selection unit 23, and a print data generating unit 24, as functional blocks.

The storage unit 20 stores image data including image data that has been image-processed. The image data is obtained from the media reader 12, the ultrared ray photo receiver 13, the CD drive 14, or the FD drive 15, as mentioned above.

The GUI unit (Graphical User Interface) 21 forms graphic user interfaces that form graphic operation displays of the operation input display 100 (described in detail later) including various windows and various operation buttons and form control commands in accordance with the operation input by the operator through the graphic operation displays.

The judgment unit 22 judges whether or not the image data stored in the storage unit 20 is the image data that has been edited by the user (described in detail later).

The selection unit 23 selects the image data that has been judged to be the image data that has been edited by the user by the judgment unit 22. The selection unit 23 corresponds to image display areas 101 of the operation input display 100 (refer to FIG. 3) (described in detail later), so that the selected image data is displayed on the image display areas 101.

Hereinafter, a detailed description will be made on the selection method of selecting the image data that has been edited by the user from among all of the obtained image data. The selection method is carried out by the judgment unit 22 and the selection unit 23.

First, the judgment unit 22 judges whether or not folders containing the image data input from the media reader 12, the ultra red ray photo receiver 13, the CD drive 14 or the FD drive 15 is compliant with the DCF standard by referring to the folder structures or the folder name. Then, the selection unit 23 selects the image data disposed in a folder that has been judged not to be compliant with the DCF standard by the judgment unit 22.

Conventionally, image data that has been edited by the user is recorded in the CD-Rs in many cases, as image data such as JPEG data that is not compliant with the DCF standard.

This makes it possible to select the image data whose folder has folder name or folder structures that are not formed in accordance with the DCF standard from among the large-volume image data and folders containing such image data stored in the CD-Rs.

Next, the judgment unit 22 judges whether or not the format of the image data, whose folder has been judged to be compliant with the DCF standard, is Exif format (predetermined format). Then, the selection unit 23 further selects image data employing a format other than the Exif format (JPEG format or TIFF format, for example).

Generally, if the user edits the image data photographed by digital cameras by editing software that is not compliant with the Exif standard, the edited image data is stored as JPEG data or TIFF data that is not compliant with the Exif standard, i.e., not employing the Exif format.

This makes it possible to select image data that is not compliant with the Exif standard from among the image data stored in the storage media such as CD-Rs (i.e., even if located in a folder that has been judged to be compliant with the DCF standard).

Finally, the judgment unit 22 judges, about the image data which has been judged to employ the Exif format, whether or not there is a predetermined correspondence between first related information and second related information, e.g., the name of the folder in which the image data is stored and tag information of the Exif data in which the image data is contained. The tag information includes textual information consisting of eight alphanumeric characters, for example. The predetermined correspondence means a relationship in which manufacturer names are the same as each other that are transformed from the folder name and the tag information through the predetermined translation table. Then, the selection unit 23 further selects the image data whose corresponding manufacturer names have been judged not to be the same as each other by the judgment unit 22.

Conventionally, image data that is compliant with the DCF standard and photographed by the digital cameras has a folder that stores the image data and has a predetermined folder name, and the Exif data that contains the image data includes tag information that indicates the manufacturer name. In contrast, in the image data that has been edited by the user, the manufacturer names indicated by the folder name and the tag information may be different from each other.

This makes it possible to select the image data in which the manufacturer names are not the same as each other comparing the name of the folder in which the image data is stored and the tag information of the Exif data in which the image data is contained, when dealing with the image data compliant with the DCF standard and stored in the storage media such as CD-Rs. In other words, image data can be selected that has been edited by the user, even though the image data may be compliant with the DCF standard and may be compliant with the Exif format.

The selection unit 23 corresponds, as described above, to the image display areas 101 of the operation input display 100 (refer to FIG. 3) (described in detail later), and displays the image data that has been selected by the selection unit 23 as the image data that has been edited by the user on the image display areas 101 (refer to FIG. 3) (described in detail later).

The print data generating unit 24 generates print data necessary for the printer 3 to carry out the printing of the image data, based on the setting of the print number and print size input by the user at the operation input display 100.

Setting Display of Print Order for the Image Data

Figure 3:
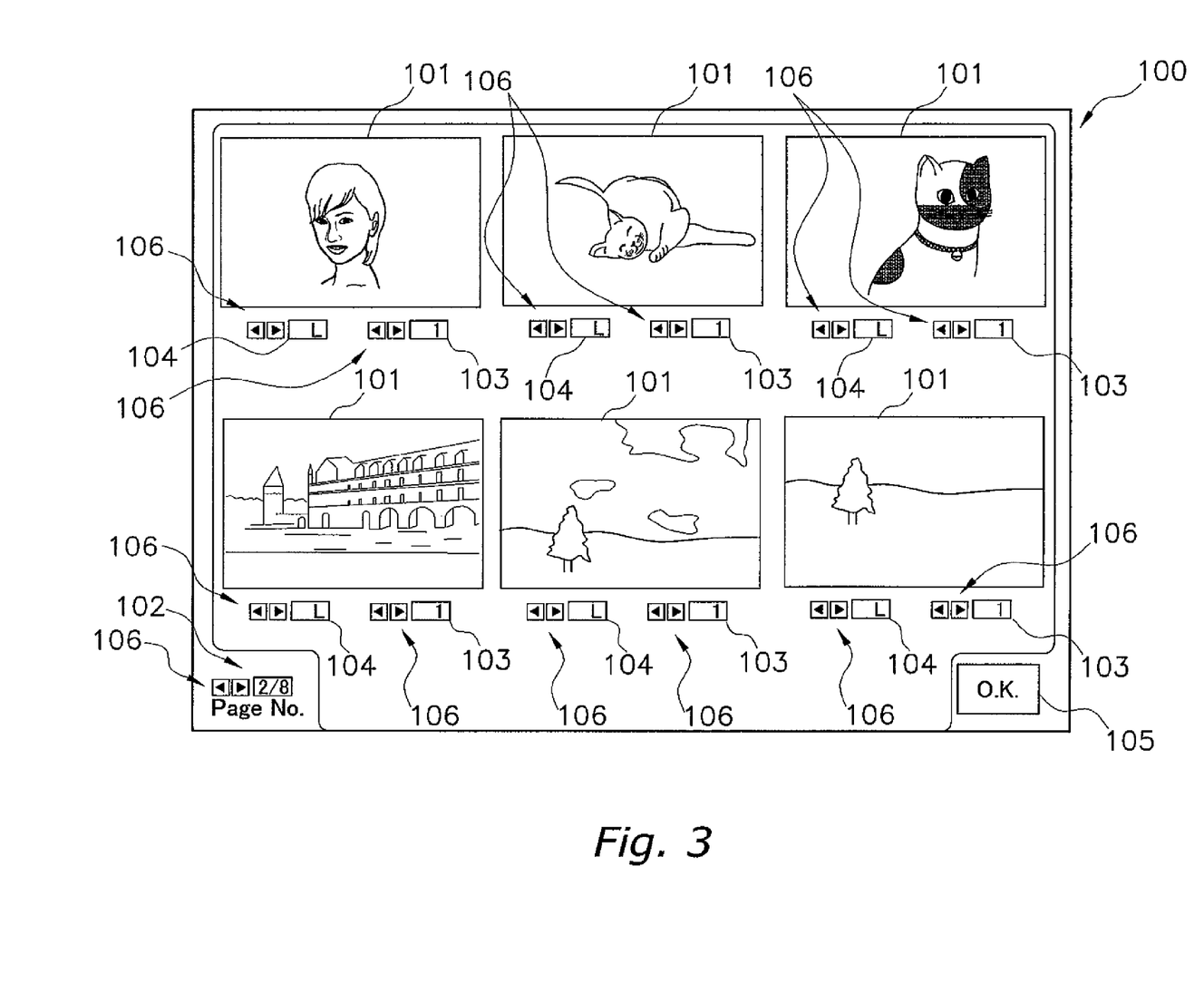
FIG. 3 is a view of the operation input display to be displayed on the monitor of the reception terminal machine in FIG. 1.

Hereinafter a description will be made on the operation input display 100 which is actually displayed on the monitor 11 when the setting of print order is performed on the image data that has been selected by the selection unit 23 in the reception terminal machine 2 of the present embodiment.

In the present embodiment, as shown in FIG. 3, on the operation input display 100, image data is displayed that has been edited by the user from among all the image data stored in CD-Rs.

The image display areas 101 correspond to the selection unit 23, and, as shown in FIG. 3, are located at three positions in the upper portion and the lower portion equidistantly on the operation input display 100. The image display areas 101 display the image data that have been selected by the selection unit 23.

A page number display frame 102 is, as shown in FIG. 3, located at the left lower portion of the operation input display 100, and displays page number of the image data displayed on the operation input display 100. The display of "2/8" on the page number display frame 102 indicates that the page now displayed on the operation input display 100 is the second one, and that the total number of the pages is eight. If an arrow of selection boxes 106 near the left side of the page number display frame 102 is pushed, pages to be displayed on the operation input display 100 are switched sequentially.

Print number display frames 103 are, as shown in FIG. 3, located under and to the right of the image display areas 101, and display the print number of the image data that is displayed on the respective image display areas 101. If the arrows of the selection boxes 106 located near the left side of the print number display frame 103 are pushed, the print number is changed. It should be noted that the number of prints in the initial setting is set to be one and the user will change only the print number of the image data necessary to be changed.

Print size display frames 104 are, as shown in FIG. 3, located under and to the left of the image display areas 101, and display the print size of the image data displayed on the image display areas 101. If the arrows of the selection boxes 106 located near the left side of the print size display frame 104 are pushed, the print size is changed. It should be noted that the print size in the initial settings is set to be "L" size, the user will change only the print size of the image data necessary to be changed.

An OK button 105 is located at the lower right end of the operation input display 100, and is used to finish the setting of the selection process of the operation input display 100.

Setting of the Selection Process for the Image Data

The selection processing flow for the image data by the reception processing machine 2 in accordance with the present embodiment, with reference to the a flowchart shown in FIG. 4 and the operation input display 100 in FIG. 3 displayed on the above-described monitor 11 will now be described. As one example of the selection processes, a selection process will be described that selects the image data which has been edited by the user from among all the image data contained in the CD-R inserted in the CD drive 14.

At step S1, the reception terminal machine 2 reads in all of image data contained in the CD-R inserted in the CD drive 14 by the user.

At step S2, the judgment unit 22 judges whether or not the folder in which the image data is stored is compliant with the DCF standard with reference to the folder name or the folder structures. If the judgment unit 22 judges that the folder is compliant with the DCF standard, the program proceeds to step S3. In contrast, if the judgment unit 22 judges that the folder is not compliant with the DCF standard, the selection unit 23 selects the image data contained within that folder, and the program proceeds to step S6, and the image data selected by the selection unit 23 is displayed on the image display area 101 of the operation input display 100.

At step S3, the judgment unit 22 further judges whether or not the format of the image data (whose folder is judged to be compliant with the DCF standard at step S2) is the Exif format. If the judgment unit 22 judges that the format of the image data is the Exif format, the program proceeds to step S4. In contrast, if the judgment unit 22 judges that the format of the image data is not in the Exif format, the selection unit 23 selects the image data, and the program proceeds to step S6, and the image data selected by the selection unit 23 is displayed on the image display area 101 of the operation input display 100.

At step S4, the judgment unit 22 further judges, about the image data whose format has been judged to be the Exif format at step S3, whether or not there is a predetermined correspondence between the first related information related to the folder in which the image data is stored and the second related information related to Exif data in which the image data is contained. More specifically, the judgment unit 22 transforms the folder name of the folder in which the image data is stored and the tag information of the Exif data (referred to as "folder name" and "tag information", hereinafter) through the predetermined translation table. Then, the judgment unit 22 judges whether or not the manufacturer names are the same as each other that are indicated by transforming the folder name and tag information through the predetermined translation table. If the manufacturer names are the same that are indicated by transforming the folder name and tag information, the program proceeds to step S5. In contrast, if the manufacturer names are different than are indicated by transforming the folder name and tag information, the selection unit 23 selects the image data. Then, the program proceeds to step S6, and the image data selected by the selection unit 23 is displayed on the image display area 101 of the operation input display 100.

At step S5, if the judgment unit 22 finishes the judgment on all of the image data that are read from the various storage media such as CD-Rs at step S1, a sequence of selection processes is finished. In contrast, if the judgment unit 22 does not finish the judgment on all of the image data, the program proceeds to step S2 to implement a sequence of selection processes for the image data again.

Features of the Photographic Print Apparatus (1)

In the photographic print apparatus 1 of the present embodiment, the reception terminal machine 2 includes, as shown in FIG. 2, the judgment unit 22 that judges whether or not the folder in which the image data is stored is compliant with the DCF standard, and the selection unit 23 that selects the image data which has been judged not to be compliant with the DCF standard by the judgment unit 22.

Conventionally, the user records the image data that has been edited by users at home in the CD-Rs, and operates himself (manually) the reception terminal machine installed at the photographic print shop to configure the setting of print order. However, it is sometimes very troublesome for the user to find the image data edited by himself from among the potentially large amounts of image data stored in the CD-Rs to set the order. It should be noted that the image data that has been edited by the user is stored in the CD-Rs in many cases as image data that is not compliant with the DCF standard.

This makes it possible to select the image data whose folder in which the image data is stored has folder name or folder structures which is not formed based on the DCF standard, from among the large-volume image data stored in the CD-Rs.

Accordingly, from among the image data stored in the storage media, the user can select only the image data edited at home more efficiently than before.

As a result, it is possible to save the user a lot of troubles of selecting the image data to order when the user orders the print.

Features of the Photographic Print Apparatus (2)

Figure 4:
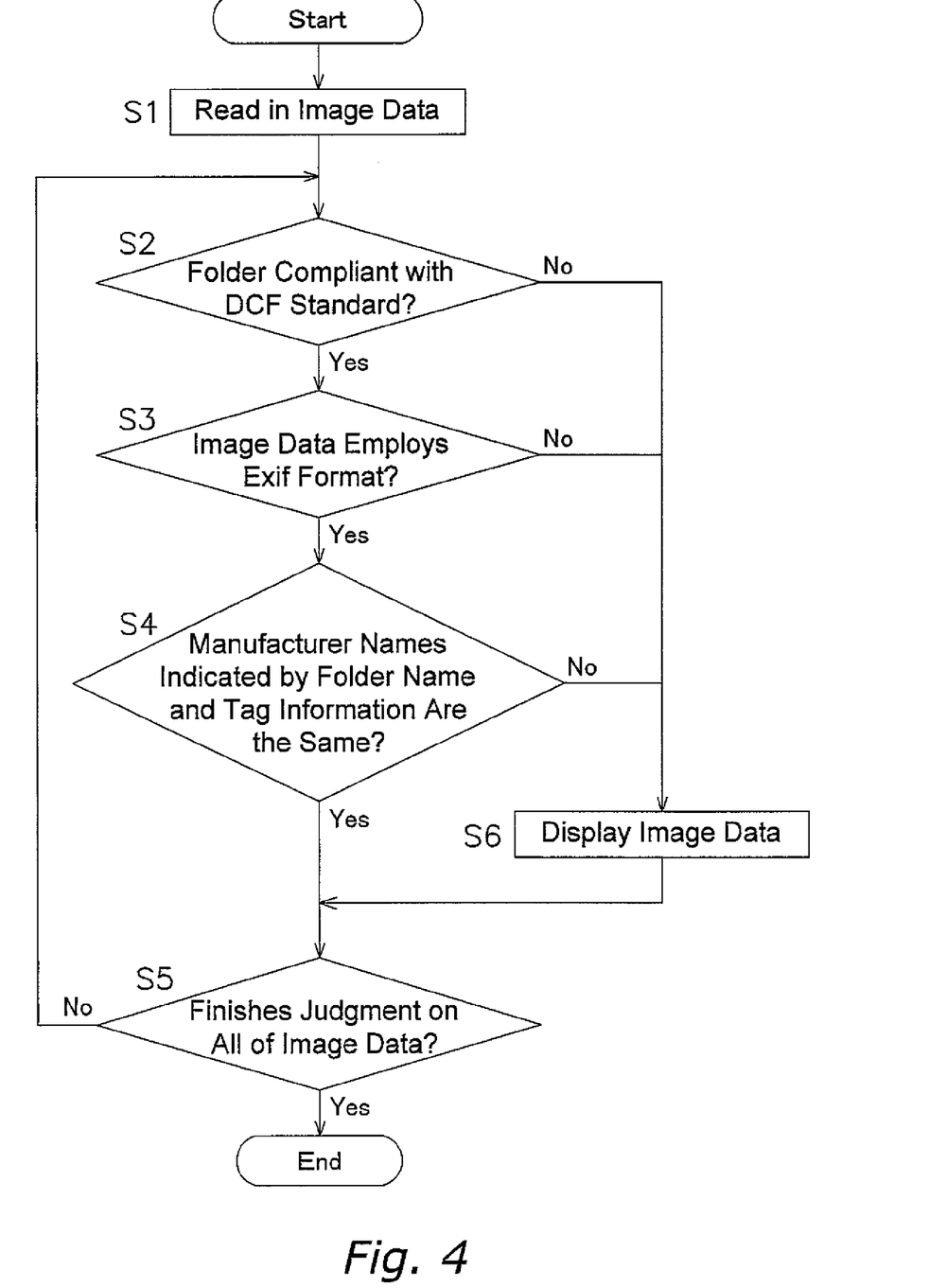
FIG. 4 is a flowchart of the processing flow when the selection process for the image data is implemented at the reception terminal machine in FIG. 1.

In the reception terminal machine 2 of the photographic print apparatus 1 in accordance with the present embodiment, as shown in FIG. 4, the judgment unit 22 (refer to FIG. 2) deals with the image data whose folder is compliant with the DCF standard, i.e., compares the folder name of the folder and the tag information of the Exif data in which the image data is contained to judge whether or not there is a predetermined correspondence between them. Then, the selection unit 23 (refer to FIG. 2) further selects the image data that has been judged not to have the predetermined correspondence by the judgment unit 22.

The predetermined correspondence means a relationship in which the indicated manufacturer names are the same when the name of the folder in which the image data is stored and the Exif data in which the image data is contained are transformed through the predetermined translation table.

This makes is possible to deal with the image data stored in the storage media such as CD-Rs that is compliant with the DCF standard, i.e., compare the name of the folder in which the image data is stored and the tag information of the Exif data in which the image data is contained to select image data whose corresponding manufacturer names are not the same as each other.

Accordingly, it is possible to select only the image data that has been edited by users at home from the CD-R more efficiently.

Features of the Photographic Print Apparatus (3)

In the reception terminal machine 2 of the photographic print apparatus 1 in accordance with the present embodiment, as shown in FIG. 4, the judgment unit 22 (refer to FIG. 2) further judges whether or not the format of the image data (whose folder in which the image data is stored is the image data compliant with the DCF standard) is the Exif format. Then, the selection unit 23 (refer to FIG. 2) further selects image data that has been judged not to employ the Exif format by the judgment unit 22.

This makes it possible to select the image data which is not recorded in the Exif format from among the image data stored in the CD-Rs.

As a result, it is possible to select only the image data that has been edited by users at home from the CD-Rs more efficiently.

Features of the Photographic Print Apparatus (4)

In the reception terminal machine 2 of the photographic print apparatus 1 in accordance with the present embodiment, the first related information is the folder name of the folder in which the image data is stored, and the second related information is the tag information of the Exif data in which the image data is contained.

This makes it possible to compare the folder name of the folder in which the image data is stored and the tag information of the Exif data in which the image data is contained to select the image data in which the manufacturer names are different.

As a result, it is possible to select the image data that has been edited by users at home from the CD-Rs more efficiently.

Features of the Photographic Print Apparatus (5)

In the photographic print apparatus 1 in accordance with the present embodiment, the reception terminal machine 2 further includes the monitor 11 to display the image data that has been selected by the selection unit 23, as shown in FIG. 1.

This makes it possible for the user to display and confirm the image data for print order when the user configures the setting of print order.

OTHER EMBODIMENTS

Although one embodiment of the present invention is described as above, the present invention is not limited to the above-described embodiment, and various modifications are possible within the scope of the present invention.

Embodiment (A)

In the above-described embodiment, in the reception terminal machine 2, as shown in FIG. 4, through steps S2, S3, and S4, the selection process of the image data that is performed in stages is described as an example. However, the present invention is not limited to this embodiment.

Figure 6:
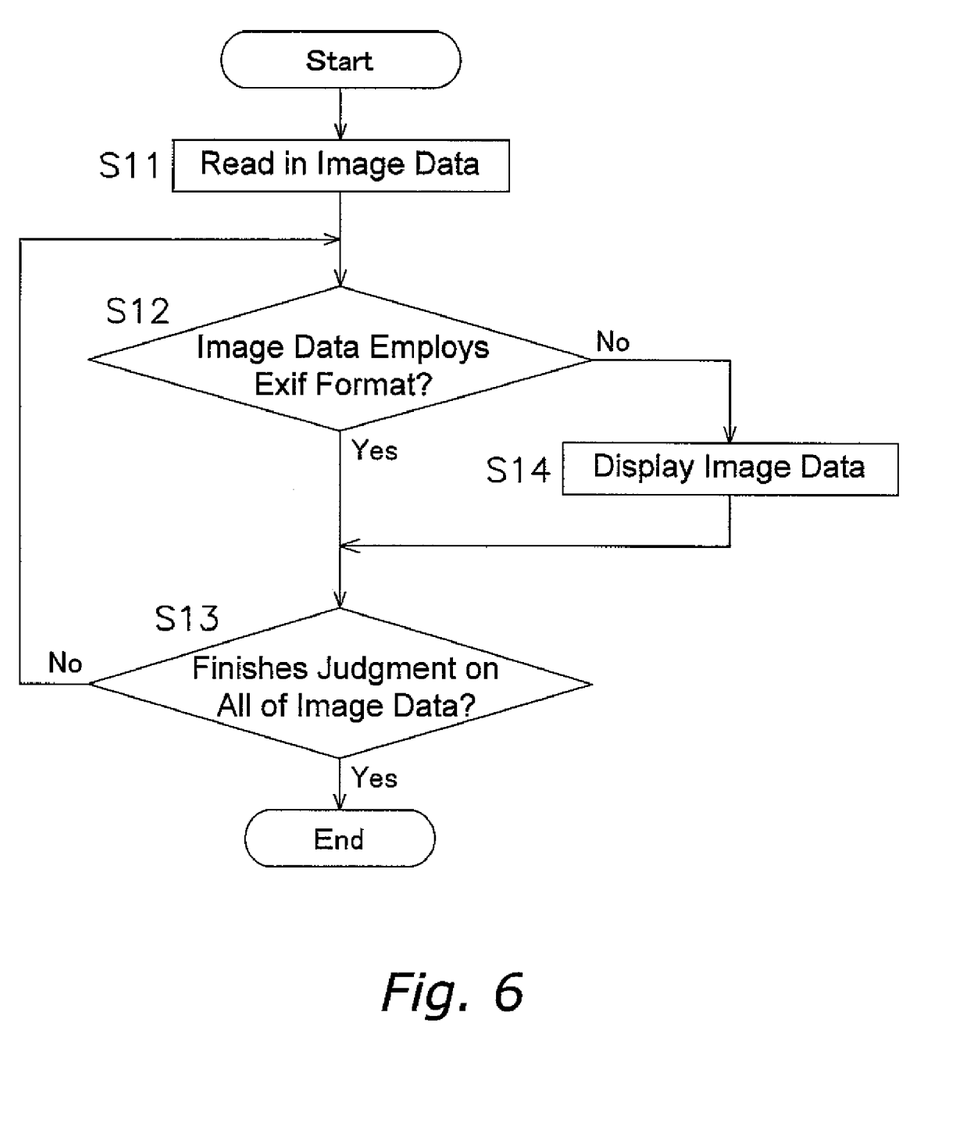
FIG. 6 is a flowchart of the processing flow when the selection process for the image data is implemented at the reception terminal machine in FIG. 1, in accordance with another embodiment of the present invention.

For example, in place of the selection process for the image data through steps S2, S3, and S4 in the flowchart shown in FIG. 4, the selection process at step S12 in the flowchart shown in FIG. 6 may be implemented for selecting the image data. A more detailed description will now be made of the selection process for the image data in accordance with the flowchart shown in FIG. 6.

At step S11, in the reception terminal machine 2, all of the image data that are stored in the CD-R inserted into the CD drive 14 by the user are read.

At step S12, the judgment unit 22 judges whether or not the image data employs the Exif format. If the judgment unit 22 judges that the Exif format is employed, the program proceeds to step S13. In contrast, if the judgment unit 22 judges that the Exif format is not employed, the selection unit 23 selects the image data, and the program proceeds to step S14. At step S14, the image data selected by the selection unit 23 is displayed on the image display area 101 of the operation input display 100 (refer to FIG. 3).

At step S13, if the judgment unit 22 finishes a judgment on all of the image data read at step S11 and stored in various storage media such as CD-Rs, a sequence of the selection processes is finished. In contrast, if the judgment unit 22 does not finish a judgment on all of the image data, the program proceeds to step S12 to implement a sequence of the selection process for the image data again.

In this case, too, similar effects by the reception terminal machine 2 in accordance with the above-described embodiment can be obtained. In other words, in this example, a simplified selection process is utilized, which can achieve many of the benefits of the preceding embodiment, in a simplified manner.

Embodiment (B)

In the above-described first embodiment, in the reception terminal machine 2, as shown in FIG. 4, through steps S2, S3, and S4, an example in which the selection process for the image data is performed in stages is described. However, the present invention is not limited to this embodiment.

For example, in the reception terminal machine 2, a selection process may be performed that includes a step of judging whether or not the folder in which the image data is stored is compliant with the DCF standard at least step S2 among step S2, S3, and S4, and a step of selecting the image data stored in the folder which is not complaint with the DCF standard.

In this case, it is possible to more simplify the selection process for the image data. However, since it might be unable to select all of the image data that have been edited by the user from among the image data stored in the CD-Rs, it is more preferable to employ the selection process for the image data in accordance with the above-described first embodiment.

Embodiment (C)

In the above-described first embodiment, the present invention is described referring to an example realized as the reception terminal machine 2. However, the present invention is not limited to this embodiment.

For example, the present invention may be realized as an image data process program to cause computers to implement the selection process for the image data, the process including a step of judging whether or not the folder in which the image data is stored is compliant with the DCF standard at least at step S2 among the above-described steps S1 through S6, and a step of selecting the image data whose folder is not compliant with the DCF standard at step S2.

Even if the present invention is realized as an image data process program, since the computer implements the selection process for the image data, it is possible to obtain similar effects of the reception terminal machine 2 in accordance with the above-described first embodiment.

Embodiment (D)

In the above-described first embodiment, in the reception terminal machine 2, an example is described wherein the directories are realized as folders. However, the present invention is not limited to this embodiment.

For example, regarding OS which does not have folders such as UNIX (registered trademark) and MS-DOS (registered trademark), directories can be used in place of folders.

In this case, too, similar effects of the reception terminal machine 2 in accordance with the above-described first embodiment can be obtained.

Embodiment (E)

In the above-described first embodiment, in the reception terminal machine 2, the judgment unit 22 transforms the name of the folder in which the image data is stored as first related information and the tag information of the Exif data in which the image data is contained as second related information through the predetermined translation table. Then, it is judged whether or not manufacturer names have a relationship of the same one (the predetermined correspondence) that are indicated by transforming the folder name and the tag information through the predetermined translation table. However, the present invention is not limited to this embodiment.

For example, it is possible to compare the creation date of a folder in which the image data is stored as first related information and the creation date included in the tag information of the Exif data in which the image data is contained as second related information to judge whether or not the creation dates are the same.

In this example, by judging whether or not the creation date of the folders and the creation date of the Exif data are the same, similar effects of the reception terminal machine 2 in accordance with the above-described first embodiment can be obtained.

Embodiment (F)

In the above-described first embodiment, in the reception terminal machine 2, an example is described wherein the judgment unit 22 judges whether or not the predetermined format is the Exif format. However, the present invention is not limited to this embodiment.

For example, if the image data the user wants to select is the image data other than JPEG data in the Exif format, it may be judged whether or not it is JPEG data in the Exif format as a predetermined format.

In this example, too, similar effects of the reception terminal machine 2 in accordance with the above-described first embodiment can be obtained.

Embodiment (G)

In the above-described first embodiment, an example is described wherein the reception terminal machine 2 is provided with the monitor 11. However, the present invention is not limited to this example.

For example, if it is not necessary to confirm the image data when ordering the print, the reception terminal machine 2 does not need the monitor 11.

In this case, it is possible to cut the cost for manufacturing the reception terminal machine 2.

However, in this case, since it is impossible to confirm the image data when ordering the print, it is preferable to provide a monitor as in the above-described first embodiment.

Embodiment (H)

In the above-described first embodiment, an example is described wherein the image data process apparatus is the reception terminal machine 2 of the photographic print apparatus 1 by which the user orders the print. However, the present invention is not limited to this example.

For example, the image data process apparatus can be provided in a photographic print system or a film processor by which the operator implements the print process.

In this case, similar effects of the reception terminal machine 2 in accordance with the above-described first embodiment can be obtained.

In addition, for example, the image data process apparatus may be a reception terminal machine installed apart from a printer.

In this case, even if the user configures the setting of print order by a reception terminal machine and the operator implements the print process by a printer installed apart from the machine (a photographic print apparatus, a photographic print system or a film processor, for example), similar effects of the reception terminal machine 2 in accordance with the above-described first embodiment can be obtained.

Embodiment (I)

In the above-described first embodiment, an example is described wherein based on the setting of print order by the user in the reception terminal machine 2, the print process is implemented at the printer 3. However, the present invention is not limited to this example.

For example, if the user configures the setting of print order at the reception terminal machine 2, and the print output is carried out by the operator at a processor, a photographic print apparatus or a laser printer, for example, (other than the printer 3, i.e., other than the photographic print apparatus 1), print claim checks (the usage will be described in detail later) contained in the box 4 (refer to FIG. 1) may be used. In addition, for example, if the image data process apparatus is a reception terminal machine installed apart from a printer, and, for example, based on the setting of print order configured by the user at the reception terminal machine, the operator such as a shop staff operates the photographic print apparatus to perform the print process, the print order can be performed using the print claim checks as above.

The usage of the print claim checks will now be specifically described with reference to FIG. 5, referring to an example in which the user inserts the CD-R recording the image data into the CD drive 14 (refer to FIG. 1).

Figure 5:
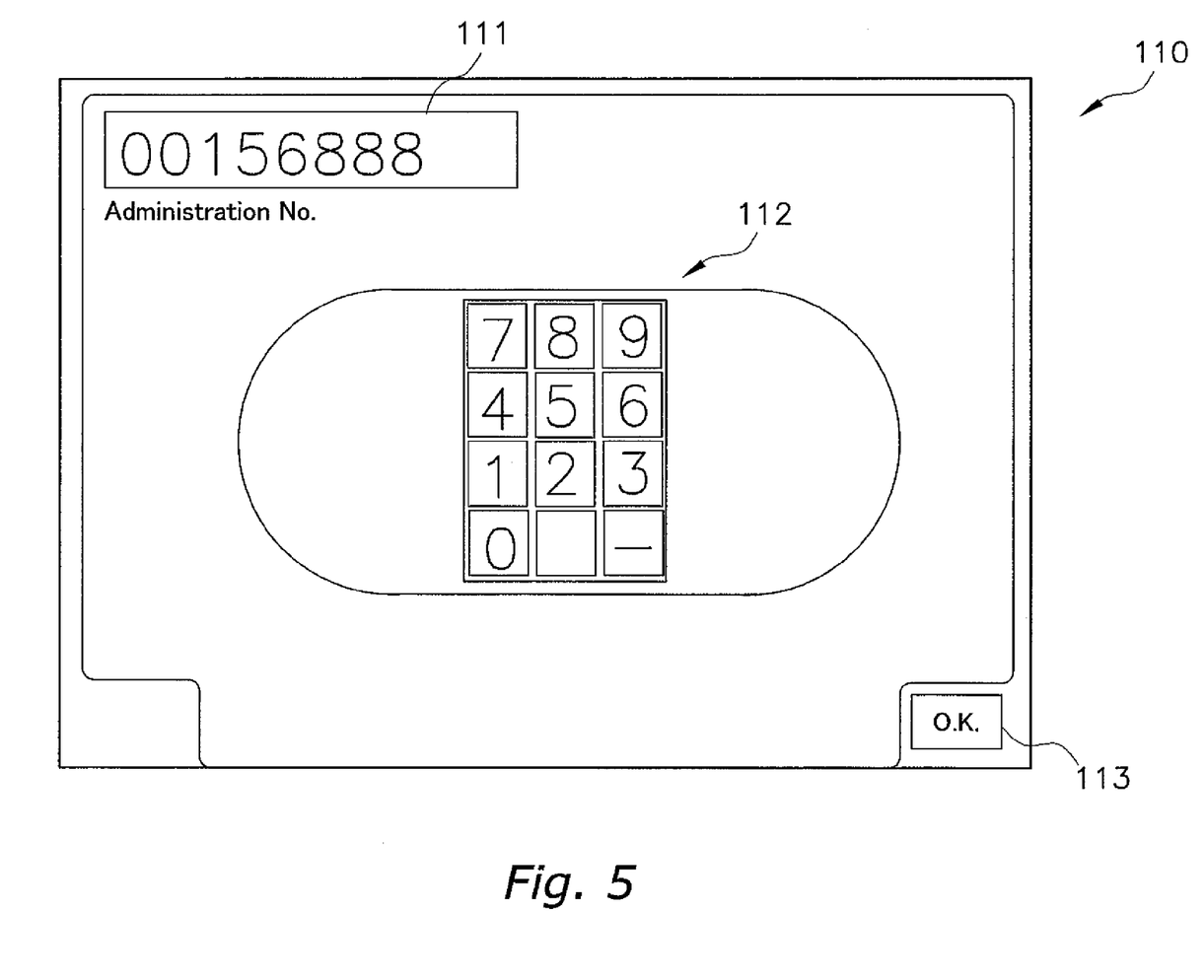
FIG. 5 is a view of the administration number input display, to be displayed on the monitor of the reception terminal machine in FIG. 1, in accordance with another embodiment of the present invention.

When the user inserts a CD-R in which the image data is recorded into the CD drive 14, for example, the administration number input display 110 shown in FIG. 5 is automatically displayed on the monitor 11. Then, at the administration number input display 110, the user takes one of the print claim checks contained in the box 4, and inputs the administration number written on the print claim check by pushing input keys 112. At this time, since the input administration number is displayed on an administration number display area 111, the user can confirm whether or not the administration number conforms to the administration number printed on the print claim check. Then, after the user confirms that the administration number is accurately input, the user pushes an OK button 113 to finish inputting the administration number.

Conventionally, in a case that the user orders the print at the reception terminal machine, the shop staff prints the administration number on the receipt by a receipt printer (i.e., a special printer) and gives it to the user. The administration number is also printed on the backside of the photographic print for which the user has ordered the print. When giving the photographic print to the user, the administration number of the receipt brought by the user and the administration number printed on the backside of the photographic print are compared to surely give the photographic prints ordered by a particular user to the correct user.

However, it takes a lot of costs to install a special printer as above to print the administration number onto the receipt.

Therefore, in the reception terminal machine 2, the print claim checks on which the administration number is printed are contained in the box 4 located on the side of the upper portion of the printer 3. When the user orders the print, as described above, the user inputs the administration number printed on the print claim check on the administration number input display 110. Then, when receiving the print order, the user shows print claim check to the operator such as a shop staff at the check out desk to receive the photographic print, for example.

Accordingly, when giving the photographic print to the user, the administration number written on the print claim check brought by the user and the administration number input at the administration number input display 110 are compared to surely give the photographic prints ordered by a particular user to the correct user.

As a result, since the special printer is unnecessary, it is possible to cut the cost of the apparatus.

Embodiment (J)

In the above-described other embodiment (I), on the administration number input display 110 shown in FIG. 5, an example is described wherein the administration number written on the print claim check is input by the user. However, the present invention is not limited to this embodiment.

For example, in place of inputting the administration number written on the print claim check by the user, the administration number is written in advance on a bag in which the ordered photographic prints are put (DP bag), and the user inputs the administration number written on the DP bag on the administration number input display 110.

In this case, since it is unnecessary to prepare the print claim checks, it is possible to cut the cost of the print claim checks.

Embodiment (K)

In the other embodiment (I), on the administration number input display 110 shown in FIG. 5, an example is described wherein the user inputs the administration number written on the print claim check. However, the present invention is not limited to this embodiment.

For example, in place of inputting the administration number of the print claim check on the administration number input display 110, the user can use arbitrary four-digit personal identification numbers in place of the administration number. As personal identification numbers, other than the above-described four-digit personal identification number, telephone numbers of the cell phone or at home of the user or the date of birth can be used.

Alternatively, for example, the above-described personal identification number may be a combination of two-digit alphanumeric characters and the user's name.

If there is a conflict between the personal identification numbers, the reception terminal machine is designed not to receive the latter personal identification number. Accordingly, it is possible to prevent the conflict between a plurality of user's personal identification numbers.

In these cases, since it is unnecessary to prepare the print claim checks, it is possible to cut the cost of the print claim checks. In addition, there are effects of saving the user the trouble of bringing the print claim check to the checkout desk.

Embodiment (L)

In the other embodiment (I), in the reception terminal machine 2 installed in the photographic print apparatus 1, an example is described wherein the administration number is used to compare the photographic prints ordered by the user. However, the present invention is not limited to this embodiment.

Conventionally, the photographic print apparatus and the reception terminal machine have been provided separately, and the user operates the reception terminal machine to order the print.

Among the reception terminal machines, some of them issue a receipt and a customer slip to users through the special printer, the receipt mechanism or the receipt issuing program, when the user order the print, for example. Then, the user gives the issued receipt to the operator at the reception desk, and the operator, based on the receipt received from the user, operates the photographic print apparatus to implement the print process. In addition, based on the received receipt, the operator compares the print order by the user. The receipt recites information to identify the print order and private information such as name and telephone number of the user However, in this reception terminal machine, if the receipts are issued, it is troublesome for the user to fill in the private information and for the reception terminal machine to issue the receipts. In addition, special printers that issue receipts need to be installed in the reception terminal machine. Accordingly, the cost of the apparatuses is increased, and private information could become public, especially if the receipts are lost.

Therefore, for example, at the reception terminal machine, when the user orders the photographic prints, the user inputs the personal identification number that is arbitrarily decided by the user, and the user remembers the catchy image or character strings displayed on the monitor. Then, when handing over the photographic prints, through the personal identification number and the catchy image or character strings, the order number of the order by the user is confirmed and the personal information is identified.

Accordingly, if the operator operates the photographic print apparatus to implement the print process based on the print order performed by the user at the reception terminal machine, it is unnecessary to issue the receipts, thereby saving the user the trouble of filling in the private information. In addition, since it is unnecessary to provide a special printer, it is possible to cut the cost of the apparatuses. Furthermore, it is possible to prevent the private information from leaking when the receipt is lost. It is also possible to prepare number tickets at shops and use the number of the number ticket in place of the personal identification number, for example.

Embodiment (M)

In the above-described first embodiment, at the reception terminal machine 2, an example is described wherein the image data is read from the storage media such as CD-Rs.

Conventionally, in the storage media such as CD-Rs recorded at the photographic print shop, data such as templates and thumbnail images as well as the image data photographed by the digital camera are included.

Conventionally, some of the reception terminal machines do not read the image data unnecessary for the print order such as the above-described templates or thumbnail images, and reads only the image data contained in specific folders. Accordingly, for example, in a case of the CD-R recorded by the user at home, since the reception terminal machine can not recognize the folders in which the image data is stored as the above-described "specific" or special folders, it might not be able to read in the image data at the reception terminal machine.

Therefore, in the reception terminal machine, for example, it is judged whether or not the storage media such as CD-Rs are recorded at the photographic print shop, and if the storage media are recorded at the photographic print shop, only the image data included in the specific folder is read in conventionally. In contrast, if the storage media is not recorded at the photographic print shops, the reception terminal machine reads in all of the image data contained in the storage media. As a method of judging whether or not the image data is recorded at the photographic print shop, for example, there is a method of judging whether or not files for automatically starting the CD-Rs such as autorun.inf are included in the CD-Rs. If the above-described file is included, it is possible to judge that the CD-R is recorded at the photographic print shops. Alternatively, for example, it can be judged whether or not the volume name of the CD-R is a predetermined name. In this case, if the volume name of the CD-R is a predetermined name (such as "qsscd"), it is judged that the CD-R is recorded at the photographic print shop. Alternatively, for example, it can be judged whether or not a viewer software application is contained in the CD-R. In this case, if the CD-R contains the viewer software application, it is judged that the CD-R is recorded at the photographic print shop.

In this case, even if the CD-Rs are recorded at places other than graphic print shops, the reception terminal machine can surely reads in the image data contained in the storage media such as CD-Rs. If the CD-R is recorded at the photographic print shop, the reception terminal machine can read in only necessary image data, i.e., not reading in unnecessary image data such as thumbnail images.

INDUSTRIAL APPLICABILITY

Since the image data process apparatuses in accordance with the present invention affords effects of saving a lot of troubles of selecting the image data, they can be widely applied to various image data process apparatuses and image data process programs.

The invention claimed is:

1. An image data process apparatus comprising:
a judgment unit configured to judge whether or not a directory in which image data is stored is compliant with a DCF standard; and
a selection unit configured to select the image data stored in the directory if the directory has been judged not to be compliant with the DCF standard by the judgment unit as image data that a user has edited and wishes to output,
the judgment unit being further configured to judge, about the image data that is stored in the directory compliant with the DCF standard, whether or not the image data employs a predetermined format, and
the selection unit being further configured to select the image data that has been judged not to employ the predetermined format by the judgment unit as image data that the user has edited and wishes to output.

2. An image data process apparatus according to claim 1, wherein
the judgment unit is further configured to judge whether or not there is a predetermined correspondence between first related information related to the directory in which the image data is stored and second related information related to Exif data in which the image data is contained if the directory has been judged to be compliant with the DCF standard by the judgment unit, and
the selection unit is further configured to select the image data that has been judged not to have the predetermined correspondence between the first related information and the second related information by the judgment unit.

3. An image data process apparatus according to claim 2, wherein
the first related information is name information of the directory in which the image data is stored, and
the second related information is tag information of the Exif data in which the image data is contained.

4. An image data process apparatus according to claim 1, wherein
the judgment unit is further configured to judge whether or not the image data employs a predetermined format if the directory has been judged to be compliant with the DCF standard by the judgment unit, and the selection unit is further configured to select the image data that has been judged not to employ the predetermined format by the judgment unit.

5. An image data process apparatus according to claim 1, further comprising a display unit configured to display the image data selected by the selection unit.

6. A computer readable medium encoded with an image data process computer program configured to implement a process of selecting image data that causes a computer to implement a method of selecting image data, comprising:

judging whether or not a directory in which image data is stored is compliant with the DCF standard; and selecting the image data stored in the directory that has been judged not to be compliant with the DCF standard during the judging as image data that a user has edited and wishes to output, further judging, about the image data that is stored in the directory compliant with the DCF standard, whether or not the image data employs a predetermined format; and further selecting the image data that has been judged not to employ the predetermined format as image data that the user has edited and wishes to output.

* * * * *